Figure 1:
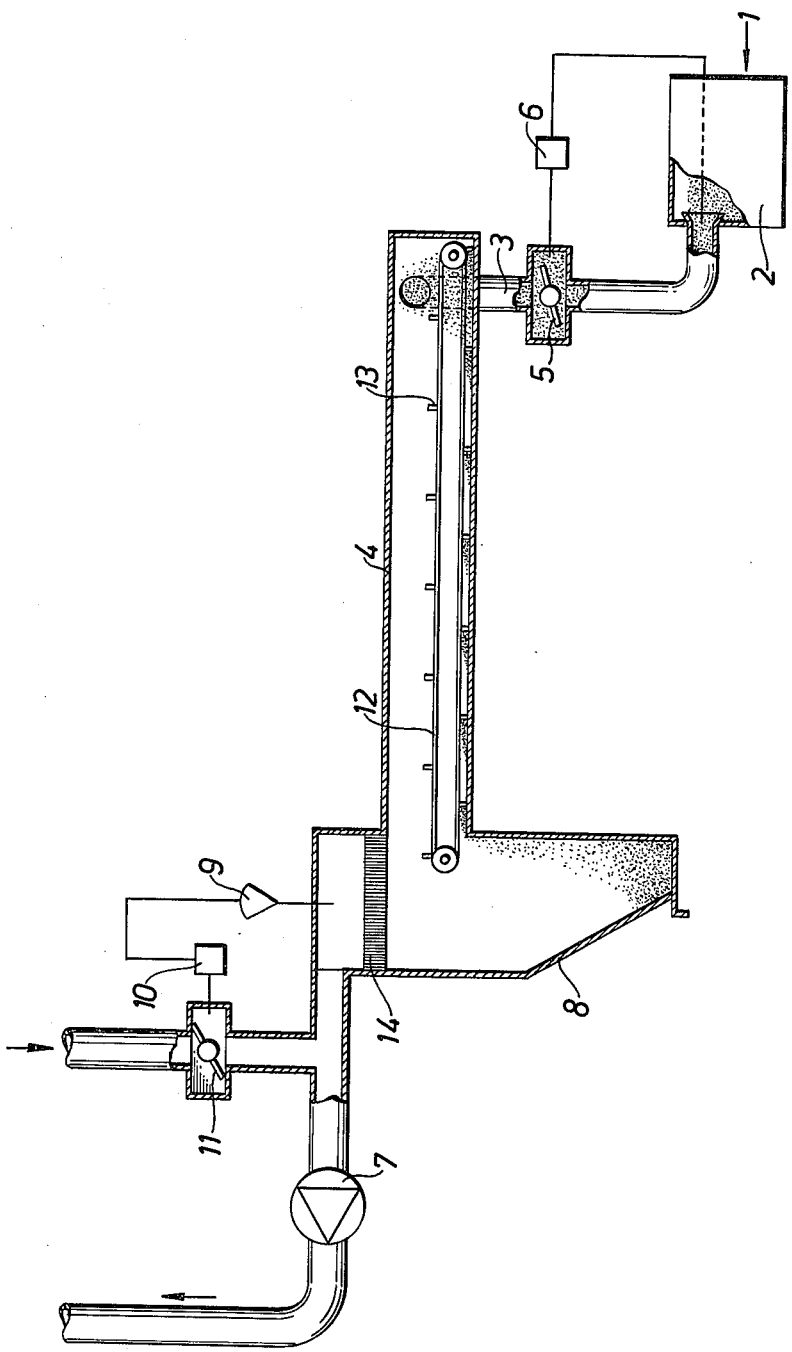

United States Patent [19]

Larsson et al.

[11] 4,318,643
[45] Mar. 9, 1982

[54] APPARATUS FOR CONVEYING WASTE MATERIALS BY SUCTION

[75] Inventors: Bertil S. W. Larsson; Stefan J. A. Bokfors; Karl G. Olsson, all of Stockholm, Sweden

[73] Assignee: AB Svenska Flaktfabriken, Nacka, Sweden

[21] Appl. No.: 108,035

[22] Filed: Dec. 28, 1979

[51] Int. Cl.³ .......................................... B65G 53/66
[52] U.S. Cl. ........................................ 406/14; 406/82; 406/117; 406/151; 406/170
[58] Field of Search .................... 406/12, 14, 15, 77, 406/82, 83, 84, 93, 117, 118, 151, 170, 195; 15/301, 314

[56]  References Cited
U.S. PATENT DOCUMENTS

| 861,549 | 7/1907 | Stoetzel | 406/170 |
| 2,994,561 | 8/1961 | Kelley | 406/79 |
| 3,343,197 | 9/1967 | Carsey | 15/314 X |
| 3,509,911 | 5/1970 | Carsey | 406/117 X |
| 3,953,078 | 4/1976 | Aitken | 406/117 |
| 4,108,498 | 8/1978 | Bentsen | 406/117 |

FOREIGN PATENT DOCUMENTS 1084689  9/1967  United Kingdom ............... 406/117

Primary Examiner—James L. Rowland
Attorney, Agent, or Firm—Dann, Dorfman, Herrell and Skillman

[57] ABSTRACT

In a dust extraction system for woodworking machinery, the dust is collected by a hood over each machine and is carried by an air flow produced by a blower through a branch conduit to a manifold which is common to a number of branch conduits. The manifold is made sufficiently large that the air flow velocity in the manifold is too low to carry the dust along the manifold, and therefore the dust collects at the bottom of the manifold, from which it is removed at intervals by a conveyor, which carries the dust to a central hopper. A control system keeps the subatmospheric pressure in the manifold substantially constant, so that the number of machines served by the system can be changed without affecting the system performance.

12 Claims, 3 Drawing Figures

APPARATUS FOR CONVEYING WASTE MATERIALS BY SUCTION

DESCRIPTION

The present invention concerns an apparatus for conveying particulate waste materials from a plurality of remote points to a central collecting point.

It is already known, for example, in the processing industry, to connect machines in a workshop room to a conveyor system with suction air to receive waste materials forming during processing and transport them to a central collection site. This prevents the waste materials from dispersing in the air, which substantially improves the working conditions. Devices of this type are used extensively, particularly in wood processing plants.

The known arrangements have many disadvantages. When the waste materials are transported the whole way from the local suction point to the central collection site, through relatively narrow branch lines at first, followed by a relatively wide trunk line, the air velocities at all points of the apparatus must be adjusted in such a way that they also enable the wastes to be conveyed through the wide trunk line. In segments where one or more branch lines open into the trunk line, dimensions must be changed so that the air velocity can be held essentially constant in view of the larger quantity of air. The apparatus must therefore be dimensioned according to the maximum number of machines that are connected to it, and operate simultaneously. This means that the devices known heretofore have no flexibility, but can be used only for a fixed predetermined number of machines with a fixed predetermined arrangement. A deviation from the machine installation on which the design is based can lead to serious consequences. In such a case, the apparatus must be rebuilt to acceptably satisfy the requirements that were intended to be satisfied by the apparatus at the outset. Thus, one cannot simply connect a machine anywhere to the trunk line of known devices without incurring serious consequences for the suction capacity in the branch lines of the remaining machines connected to the system.

Another disadvantage of known systems is that, to save energy, the purified and filtered conveyor air is allowed to flow freely into the rooms. It would be too expensive to discharge the warm room air to the atmosphere. Even if it is assumed that the precipitation and filtering units remove an amount on the order of magnitude of 98%, this still means that 2% of the waste materials flow back into the rooms. This eventually causes concentration of particles in the air, which cause problems for the persons working in the rooms.

Of course, another disadvantage is that both the capacity of the blowers and the filtering capacity must be adapted to the unfavorable case in which waste materials in all parts of the apparatus must be conveyed further to the collection sites. This means that both the conveyor blowers and filters must be oversized, entailing a rather substantial energy consumption.

The purpose of the present invention is to devise an apparatus that avoids all disadvantages while providing for flexible adaptation of a conveyor system with suction air to the current requirement without any need for changing the dimensions of the conveyor lines. Another purpose of the invention is to prevent waste materials from being reintroduced into the rooms via the air return.

In accordance with the invention, the problem is solved with an apparatus for conveying particulate waste materials from a plurality of remote points to a central collection point.

The invention generally concerns an apparatus for pneumatic conveyance of waste materials, such as woodchips or sawdust, which are conveyed by a pneumatic conveyor system to a centrally located collection site. The conveyor system is designed in such a way that conveyor lines from the machines located in the room lead to a common trunk line, from which the waste materials are sent to the central collection site. Both the dimensions of the lines and the amounts of air in the suction conveyor system are designed such that the waste materials are conveyed away from the processing machines to the common trunk line, in which the materials may be deposited and accumulate. Arranged in the trunk line are special conveyance means which convey the waste materials from the trunk line to the central collection site. These conveyance means can consist either of a mechanical conveyor or a large cleaning blower, or a conveying fluid can transport the waste materials from the trunk line to the central collection site.

The conveying means can be designed as a mechanical conveyor or a gaseous or liquid conveying fluid that is made to flow through the trunk line when waste materials are temporarily deposited there.

An advantageous design of the apparatus of the invention has a control system that provides for instantaneous adaptation to the number of machines that are connected to the system that, are in operation, and whose respective branch lines are performing the suction function. These characteristics of the device of the invention have considerable advantages, partly in the form of improved working conditions and partly as a result of energy savings.

Figure 3:
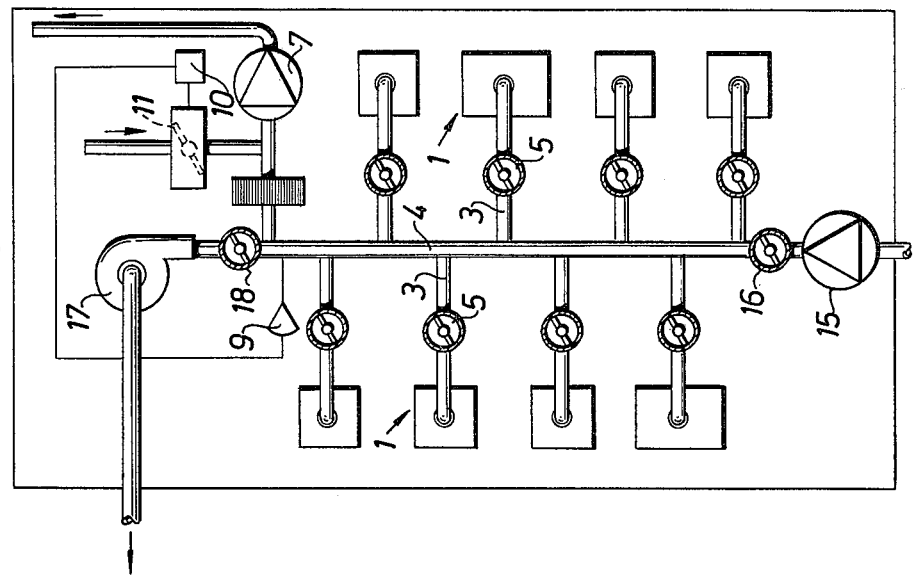
Figure 2:
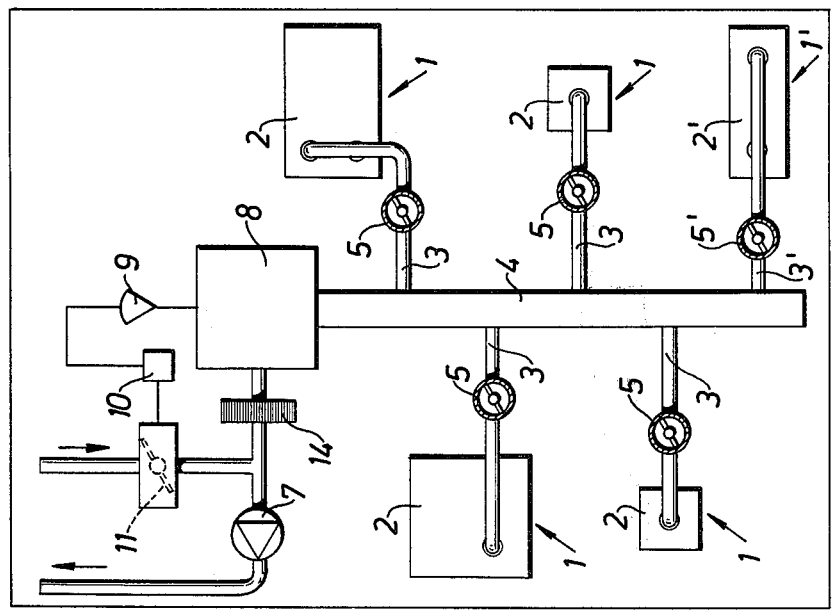

Some selected examples of designs of devices for conveyance with suction air in accordance with the invention are described on the basis of the attached drawings. These include:

FIG. 1—a schematic cross section of an apparatus with a mechanical conveyor,

FIG. 2—a schematic diagram of an apparatus in a room with several suction points, which are connected by branch lines to a trunk line with a conveyor as shown in FIG. 1, and FIG. 3—another layout of an apparatus in which the conveyance in the trunk line is accomplished by air.

The apparatus for conveyance with suction air according to FIG. 1 is designed for the conveyance of waste materials from machines of any type, such as, for example, woodworking machines, from which the waste must be removed. FIG. 1 shows only one suction point 1 in the form of a hood 2, which surrounds the machine, from which waste materials are conveyed through a branch line or branch conduit 3 to a trunk line or common manifold 4. The branch line 3 is connected to the hood 2 via a shut-off valve 5; this valve can be controlled either manually or by microswitches 6, and the microswitches 6 are arranged in such a way that the valve 5 is opened automatically when the machine is started, and closes when the machine is stopped.

The conveyance by suction air in the branch line 3 from the hood 2 to the trunk line 4 is provided by a producing means such as a blower arrangement including a conveying blower 7, which generates a vacuum in the trunk line and at a central collection site 8 for the branch lines connected to the trunk line. The vacuum is monitored by a detector 9, which senses the pressure in the manifold 4 and adjusts a throttle 11 on the suction side of the conveying blower 7 via a control element 10.

In accordance with the invention, the dimensions of the branch line 3 and the trunk line 4 and the capacity of the conveying blower 7 are chosen such that the air velocity in each of the branch lines suffices to convey the waste materials from the machines under the hoods 2 to the trunk line 4. The air velocity in the trunk line is meanwhile insufficient to convey the waste material to the central collection site 8. Therefore, the waste materials in the trunk line 4 are deposited and accumulate at the bottom of the line. When sufficient amounts of waste materials have accumulated in the trunk line 4, they are conveyed further and discharged by a conveying means such as a mechanical conveyor 12. This conveyor can be provided with stripping elements 13, which entrain the waste materials collecting at the bottom of the trunk line and convey them to the central collection site 8.

The lightweight components, which are carried on by the conveying air in the trunk line, are separated in a filter 14. Because of the low air velocity in the trunk line 4, only very few parts of the waste materials are deposited in this way before the air can flow back freely into the rooms. Of course, one advantage of this arrangement is that there is substantially less wear on the filter than in conventional units, where the waste materials are conveyed continuously through the trunk lines by air streams.

The diagram presented in FIG. 2 of an apparatus in accordance with FIG. 1 gives only one idea of how the trunk line can be arranged in a room in which there are many suction points 1 for processing machines of any type connected to the trunk line 4 via branch lines 3. If one wishes to install other machines in this room, it is only necessary to connect an additional branch line 3' with a shutoff valve 5' to the hood 2' surrounding the machine. By means of the above-cited control equipment on the apparatus operating such suction air, after the installation of an additional branch line the detector 9 will detect less vacuum in the trunk line, when all machines are in operation. The control system 10 will then adjust the setting of the throttle 11 in such a way that the desired vacuum is formed in the trunk line. The same adjustment is, of course, accomplished when one or more machines must be taken out of operation, at which time the vacuum in the trunk line 4 is increased and as a result, the control unit acts on the throttle 11 in such a way that the proper vacuum is obtained.

The apparatus shown in FIG. 3 includes a trunk line 4, to which many machines 1 are connected, and in which the conveyance of the collected waste materials is accomplished with discharge means such as a cleaning blower device 15. The cleaning blower 15 is connected to one end of the trunk line via a valve 16. The cleaning blower draws air in from the outside, which conveys the waste materials to the central collection site. At this point, the conveyor air and the waste materials are separated by a separating means such as a cyclone filter 17, which is also connected to the trunk line via a valve 18. This type of unit can be used advantageously in existing units with suction transport where a powerful blower is available to provide for conveyance from the local suction points.

Instead of a mechanical conveyance system in trunk line 4, the old blower is used to blow the trunk line clean at regular intervals. After the air used for cleaning is obtained from outside, and after it is sent into the atmosphere when cleaning has been accomplished, this system provides essentially the same energy savings as the system described above. This apparatus also corresponds to the devices described in connection with FIGS. 1 and 2. Of course, the conveying air blower 7 in both designs can be controlled from the pressure side, and/or the control can be accomplished by regulating the rotational velocity, governed by a control element that reacts to the vacuum in the trunk line.

Instead of using air as a cleaning fluid, as described in connection with FIG. 3, a liquid can of course be used as well, such as water, which can flow through the trunk line 4 at a sufficient velocity and send the waste materials to the central collection site.

We claim:

1. Apparatus for conveying particulate waste materials from a plurality of remote points to a central collecting point comprising:
    (a) a common manifold,
    (b) a plurality of branch conduits, each branch conduit extending from one of said remote points to said common manifold;
    (c) suction-producing means for establishing airflows from said remote points into said manifold, the relative dimensions of said manifold and of said branch conduits and the magnitude of said airflows being such that the velocity of the airflow in each branch conduit is sufficiently high to entrain particulate material at the associated remote point and transport said particulate waste materials through said branch conduit, while the velocity of said airflow in said manifold is sufficiently low so that at least a substantial portion of said particulate waste is precipitated in said manifold; and
    (d) conveying means for transporting said precipitated waste materials from said manifold to said central collecting point.

2. Apparatus in accordance with claim 1, in which said conveying means comprises a mechanical conveyor having at least one moving element for transporting said precipitated waste materials to said central collecting point.

3. Apparatus in accordance with claim 1 in which said conveying means comprises discharge means operable, when operating, to produce in said manifold a fluid flow sufficient to transport said precipitated waste materials to said central collecting point.

4. Apparatus in accordance with claim 3, in which said discharge means comprises a blower device positioned and dimensioned, when operating, to produce in said manifold a flow of air whose velocity is sufficient to transport said precipitated waste material to said central collecting point.

5. Apparatus in accordance with claim 4, in which;
    said plurality of points are located within a building;
    said blower device is positioned to draw air from outside of said building; and
    said apparatus further comprises separating means positioned at said central collecting point for separating said waste material from the air supplied by said blower device, said separating means also serving to return the separated air to the space outside of said building.

6. Apparatus in accordance with claim 1, 2, or 5 in which said plurality of remote points are located within a building and said suction-producing means operates to return the air flowing in said branch conduits and said manifold into the interior space of said building.

7. Apparatus in accordance with claim 1, in which said suction-producing means comprises:
   a blower arrangement communicating with said manifold to draw air therefrom and to create sub-atmospheric pressure therein; and
   a pressure control system sensing the pressure in said manifold and controlling the operation of said blower arrangement in order to maintain a substantially constant sub-atmospheric pressure in said manifold.

8. Apparatus in accordance with claim 7 in which said blower arrangement includes a blower and said pressure control system controls the operation of said blower arrangement by adjusting the speed of said blower.

9. Apparatus in accordance with claim 7, in which said blower arrangement includes a blower having a suction side and an exhaust side, and said pressure control system controls the operation of said blower arrangement by admitting a bypass flow of air to said suction side of said blower.

10. Apparatus in accordance with claim 7, in which said blower arrangement includes a blower having a suction side and an exhaust side, and said pressure control system controls the operation of said blower arrangement by regulating the air exhausted from the exhaust side of said blower.

11. Apparatus in accordance with claim 1, 2, 5, or 10 further comprising a shut-off valve in each of said branch conduits.

12. A method of conveying particulate waste materials from a plurality of remote points in a workshop area toward a central collecting point, which comprises:
   (a) utilizing a suction source to generate a plurality of branch fluid flows from said remote points;
   (b) manifolding said branch flows into a common flow leading to said suction source;
   (c) controlling said fluid flows to transport said particulate waste materials in the branch fluid flows, and to precipitate said particulate waste materials from said common fluid flow in advance of said suction source;
   (d) recirculating the common flow from said suction source to said workshop area; and
   (e) intermittently discharging said precipitated particulate waste materials to said central collecting point.

* * * * *